Oct. 13, 1964 W. E. STRAIN ETAL 3,152,628
CLINCH NUT
Filed July 17, 1958
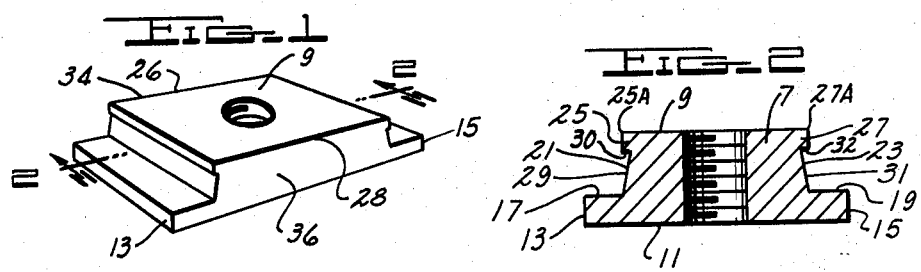
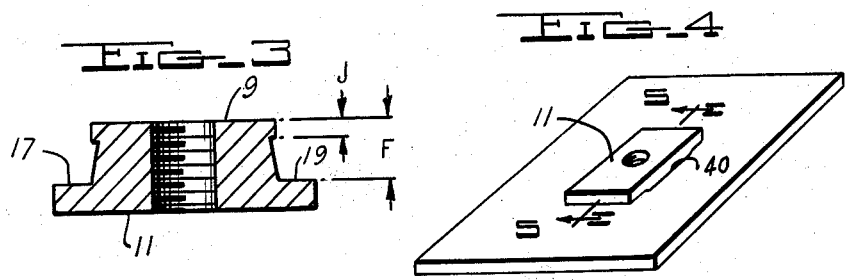
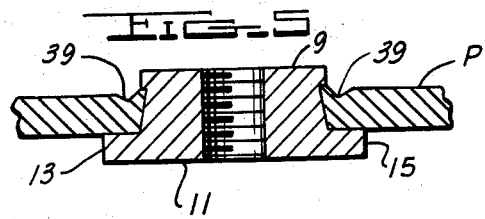
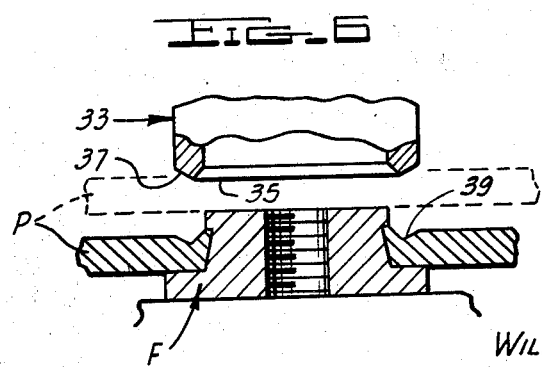
INVENTORS
WILLIAM E. STRAIN
JERRY H. STEWARD
KOTTS & SHERIDAN
ATTORNEYS 3,152,628
CLINCH NUT
William E. Strain, Dearborn, and Jerry H. Steward, Detroit, Mich., assignors to Multifastener Corporation, Detroit, Mich., a corporation of Michigan
Filed July 17, 1958, Ser. No. 749,082
3 Claims. (Cl. 151—41.73)

The present invention relates to an improved fastener construction and more particularly to a multiple-thread fastener which is used as a punch to pierce an opening through a hard, tough metal panel, while being affixed to said panel so as to provide an inexpensive, durable fastening means. This application is a continuation-in-part of our application Serial No. 285,499, filed May 1, 1952, now abandoned.

Various types of fasteners have been developed in an effort to provide a construction which is simple and efficient in use, and which will provide a strong union with the panel to which it is to be attached. Many of the prior developments have used a fastener which is constructed so as to be deformed after it is positioned on the panel to which it is attached. Many prior constructions have also provided fasteners which must be used with preformed openings in the panel to which the fastener is to be attached. Such constructions have proven expensive and do not lend themselves to high production manufacturing and assembly methods. Also, the joint between the fastener and panel has left much to be desired.

It is a principal object of the present invention to provide a fastener of tough material which is constructed and arranged so that it may be used to punch its own opening in a panel of tough material, such as steel, as it is affixed to the panel.

It is another object of the present invention to provide an efficient, durable fastener which can be manufactured rapidly in large quantities and at low cost.

It is another object of the present invention to provide such a fastener which lends itself to an extremely simple fastening operation, and which provides an unusually strong joint with the panel to which it is affixed.

Other objects of this invention will appear in the following description and appended claims, reference being had to the accompanying drawings forming a part of this specification wherein like reference characters designate corresponding parts in the several views.

In the drawings:

FIG. 1 is a perspective view of a fastener embodying the present invention.

FIG. 2 is a sectional view taken along the line 2—2 in the direction of the arrows, FIG. 1.

FIG. 3 is a cross sectional view similar to FIG. 2, showing certain important measurements.

FIG. 4 is a perspective view of a fastener of the present invention affixed to a panel.

FIG. 5 is a sectional view taken along the line 5—5 in the direction of the arrows, FIG. 4.

FIG. 6 is an elevation, partly in section, showing the fastener being affixed to a panel.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

A fastener embodying the present invention is shown in the drawings. It is generally rectangular through the body 7 and has substantially parallel top and bottom faces 9 and 11. A pair of flanges 13 and 15 extend from the base of the body 7. Platforms 17 and 19 provided by the flanges are substantially flat and substantially parallel with the top face 9 and bottom face 11 of the fastener body 7. These platforms support a portion of a metal panel when a die button is pressed against the metal panel as explained later. A pair of shallow grooves 21 and 23 are provided in the body 7 of the fastener between the top face 9 and each flange 13 and 15. These grooves provide the squared shoulders 25 and 27 and the walls 29 and 31. Walls 29 and 31 may be tapered as shown, or perpendicular to platforms 17 and 19. The intersection of the perpendicular edge surfaces 25A and 27A with top face 9 form two of the cutting edges of the punch while the two other cutting edges are formed at the intersection of the longitudinal edges 26 and 28 with the top of face 9. When a panel member to which a fastener is applied is thin, a tapered wall construction is used. However, when the panel member is thicker, a straight wall construction is used, thereby permitting a greater amount of metal to flow beneath the squared shoulders 30 and 32. The underside of said shoulders is substantially parallel to the top face 9.

The fastener and sheet metal panel are joined as shown in FIGS. 5 and 6 of the drawings, and the method of joining is explained in detail in our Patent No. 2,707,322, dated May 3, 1955. Referring briefly to FIGS. 5 and 6 of the drawings in the present application, it will be noted that the fastener F is used as a punch. The die button 33 is moved down and into engagement with the metal panel P. The metal panel P is moved to the solid line position from the dotted line position. The squared shoulders 30 and 32 and the longitudinal edges 26 and 28 on the upper face 9 of the fastener, punch an opening into the metal panel against the underside 35 of the die button as the downward movement occurs. The contour 37 of the die button then displaces the metal to underlie the squared shoulders 30 and 32. The metal around opening 40 in the panel P is also displaced into the grooved areas 21 and 23 of the fastener to form a sturdy, durable, and positive joint.

The present fastener is usually used in combination with a power screw driver. The entering screw meets the fastener with considerable impact and torque. This combination of forces places the fastener under severe stress and unless the fastener is positively engaged with the panel member it will be moved out of the panel. For this reason it is essential that the fastener be applied in a positive manner as above described.

The squared shoulders 25 and 27 provide the needed strength to hold the fastener in position under the above described conditions. A further and severe test on fastener retention occurs when misalignment of parts necessitates the insertion of a drift tool through an opening in a panel and into the threaded aperture of the nut. The drift tool is then used as a lever to move the complete assembly to which the fastener has been applied into its proper position.

Having placed a great deal of stress on the value of positive fastener retention, it can be pointed out that the squared undersides 30 and 32 of the squared shoulders 25 and 27 assure positive fastener retention, regardless of using a thick or thin panel member. If the panel member is thick, the metal is flowed under the shoulders 25 and 27 as shown in FIGS. 5 and 6. Should the material be thin, it is formed so that it extends upward from platforms 17 and 19 on flanges 13 and 15 so as to be tucked securely under the undersides 30 and 32 of flanges 25 and 27. Thus, a fastener is provided which will accommodate a wide range of panel thicknesses.

The fastener having been formed by a cold rolling process is necessarily tougher, since this process work hardens the surface of the material. This additional hardness and resulting grain structure change, assures a better and sharper punching surface on the fastener proper. Extruded or otherwise machined material would not provide these satisfactory results. In addition, the cost of extruding or machining would be considerably more costly, while providing an inferior structure.

The flanges 13 and 15 are thick, and the platforms 17 and 19 are flat and parallel with bottom face 11 to provide an effective base for the metal panel as the die button 33 forms the displacements 39. The top face 9 and the bottom face 11 of the fastener are substantially flat and parallel while the sides 25, 27, 34 and 36 are perpendicular thereto, to provide clean and sharp edge for accurate piercing of the panel member. This also aids in the proper seating of the fastener, which in turn efficiently distributes the forces of piercing. Additionally, the fastener is made from cold rolled material. The manufacturing process of making the material enhances its natural characteristics, since the surfaces rolled are work hardened.

There is a relationship between certain dimensions of the fastener of the present invention which is important. Referring to FIG. 3 of the drawings, the pilot height of the fastener is indicated at "F." This is the height between the top face 9 of the fastener and the platform (17 or 19). It has been found in practice, that it is important to have F two to three times greater than J. As indicated in FIG. 3, J is the depth of the shoulder. This formula assures that there is adequate strength in the squared shoulders 25 and 27 to perform the piercing operation efficiently in a tough metal, while utilizing a minimum of inexpenisve cold rolled material in the fastener.

Having thus described our invention, we claim:

1. A piercing nut of tough material, such as steel, for use in a fastening and piercing operation with a panel of tough material, such as steel, comprising a rectangular body having two oppositely extending flanges one extending from each end of said nut, said body having two separate shallow grooves undercut therein one extending between each such flange and a point near the top of said body to provide a wall at the base of each of said grooves and a thick, short shoulder at the top of said body adjacent each of said grooves, the distance between the top of said body and the top surface of each flange being between two and three times the thickness of each shoulder, the sides of said body being substantially smooth and flat, said walls extending from said flanges to said shoulders and said shoulders being sufficiently thick to provide the necessary strength for withstanding a piercing operation, said shoulders also being constructed to provide a substantially square top face on said nut which top face is surrounded by flat vertical sides extending downwardly therefrom so that the periphery of said top face provides an efficient substantially squared piercing edge for piercing a suitable hole in a panel, said body also having a threaded hole therethrough which is surrounded on all sides by sufficient material in structurally sound proportion to prevent distortion of the threads when the nut is used in the piercing operation.

2. A piercing nut as defined in claim 1 wherein the platforms provided by the inner surfaces of the flanges are flat and substantially parallel to the bottom face of the nut.

3. A pierce nut as defined in claim 2 wherein said nut is constructed of cold formed material; the top face of the nut and the bottom face of the nut are substantially parallel; and the inner face of each flange is parallel to the inner face of the adjacent shoulder and is also parallel to the top and bottom faces of the nut.

References Cited by the Examiner

UNITED STATES PATENTS

| | | | |
|---|---|---|---|
| 37,189 | 12/62 | Westlake | 164—124 |
| 1,166,613 | 1/16 | Mackle | 164—124 |
| 1,842,117 | 1/32 | Renshaw | 151—41.73 |
| 1,919,552 | 7/33 | Hasselquist | 151—41.72 |
| 2,139,590 | 12/38 | Jessop | 151—41.73 |
| 2,177,191 | 10/39 | Sandberg | 151—41.73 |
| 2,652,942 | 9/53 | Muchy | 151—41.72 |
| 2,707,322 | 5/55 | Strain et al. | 151—41.73 |
| 2,749,606 | 6/56 | Donahue | 151—41.73 |

EDWARD C. ALLEN, *Primary Examiner.*
ARTHUR B. MILLER, *Examiner.*